No. 647,855. Patented Apr. 17, 1900.
R. MACHOLD.
PULLEY.
(Application filed June 12, 1899.)
(No Model.) 2 Sheets—Sheet 1.

Witnesses:

Inventor
Robert Machold

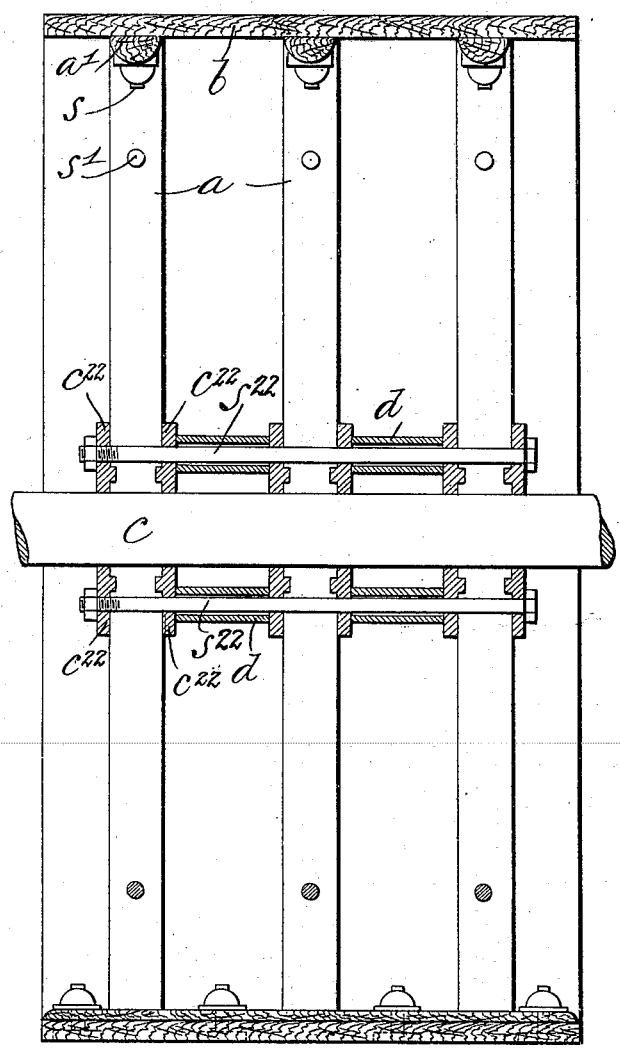

UNITED STATES PATENT OFFICE.

ROBERT MACHOLD, OF MÄHRISCH-OSTRAU, AUSTRIA-HUNGARY.

PULLEY.

SPECIFICATION forming part of Letters Patent No. 647,855, dated April 17, 1900.

Application filed June 12, 1899. Serial No. 720,261. (No model.)

*To all whom it may concern:*

Be it known that I, ROBERT MACHOLD, a subject of the Emperor of Austria-Hungary, residing at Mährisch-Ostrau, in the Province of Moravia, in the Empire of Austria-Hungary, have invented certain new and useful Improvements in Wooden Pulleys; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in wooden pulleys for belt and rope gearing, and has for its object to so construct these pulleys of bent wood that glued or cemented joints are entirely dispensed with, whereby they are rendered suitable for use in damp as well as in dry localities. This is accomplished by means of sector-shaped frames of bent wood the arc-shaped middle parts of which are secured to the inner side of the rim, while the radial parts of the frame meet, with their inner ends near the center, and are secured to the corresponding part of the adjacent frame, each pair of radial members thus united forming a spoke. The ends of these spokes are clamped between two disks or flanges arranged to form one or more circular spoke-seats and are solidly united by means of screw-bolts or tie-rods. Belt and rope pulleys with one or more series of spokes may be thus constructed at little cost and compared with the wooden pulleys hitherto known are very strong and light, particularly at the rim, so that they are especially adapted for high speed, since the bursting of the pulley is rendered almost impossible.

In the case of pulleys with several series of spokes each series is held either between a flange on the nave and a circular plate or between a pair of plates forming circular seats in which the spokes are held and auxiliary bolts for locking the flange and plate or series of plates together.

Figure 1:
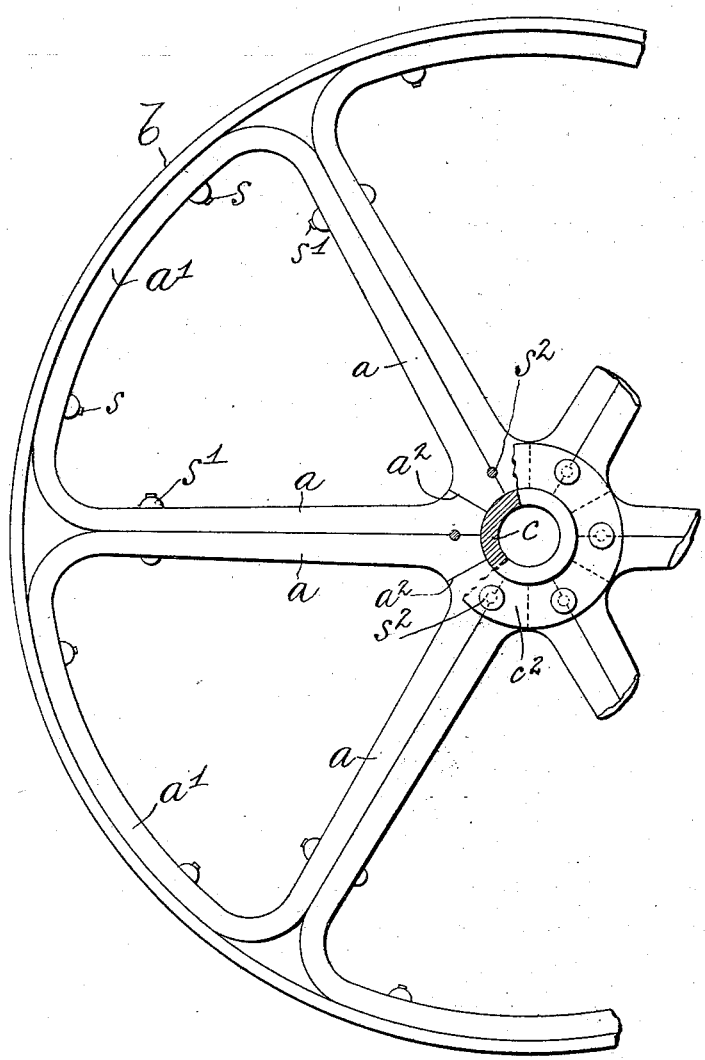
Figure 2:
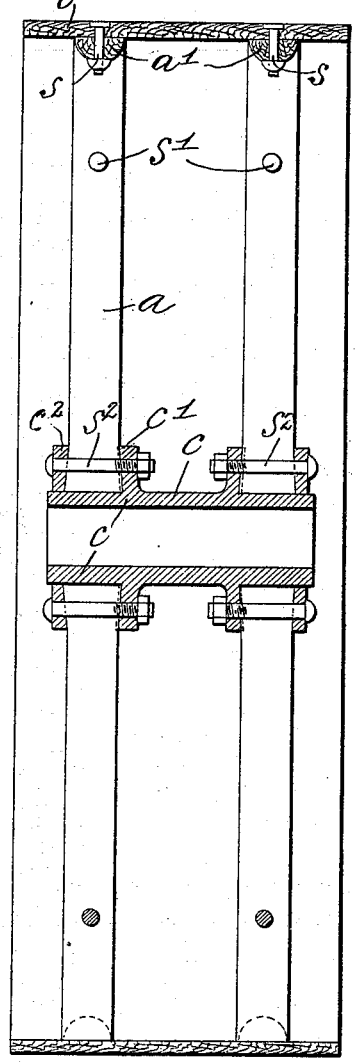

In the accompanying drawings, Figures 1 and 2 represent in side view and cross-section, respectively, a pulley constructed as above described with two series of spokes united between a flange and plate and intended for broad belts. Fig. 3 represents in cross-section a pulley composed of three series of spokes united between plates at the center.

The wooden strips $a$, of which the spokes are formed, are bent into the form of sectors, the middle arcuate parts $a'$ of which are fixed to the rim $b$ by means of bolts $s$, countersunk in the face of the rim, while the spoke members extend radially to the center and are enlarged, so as to meet and form radial joints, as at $a^2$, at the center line of the sectors, the radial members of each of two adjoining strips $a$ being fastened together by means of bolts $s'$, each pair of members thus uniting to form one spoke.

In the arrangement shown at Fig. 2 the ends of the spokes are jointed together and fitted between a flange $c'$ and a loose plate $c^2$ on a nave, $c$ the plate and flange forming a circular spoke-seat. The spokes are secured in place by means of tie-rods or bolts $s^2$, which pass through the joints of these spokes at their abutting faces and at the same time act so as to key both members of the spoke together. The connection between the spokes and the spacing of one or more series of spokes is in this case effected by the nave $c$ and by the rim $b$; but it is evident that the flange $c'$ may be substituted by another plate $c^2$ and the nave $c$ dispensed with.

According to the modified arrangement, Fig. 3, I have shown a pulley without a nave, which is replaced by a number of pairs of disks or plates $c^{22}$, slipped directly upon the shaft $c^3$. Each pair of plates corresponds to each series of spokes, and the several pairs of plates $c^{22}$ $c^{22}$ are rigidly connected together by means of bolts or tie-rods $s^{22}$, passing through all the disks or plates $c^{22}$, the distance between the contiguous pairs of plates $c^{22}$ in this case being maintained (instead of by a nave) by means of tubular spacing-pieces $d$, slipped on the bolts or tie-rods $s^{22}$ between each contiguous pair of plates $c^{22}$ $c^{22}$. By means of the said bolts or tie-rods $s^{22}$ and the rim $b$ a strong and rigid structure and a firm connection of the constituent parts of the pulley are obtained.

The circular spoke-seats may be slightly undercut, so as to make a slightly-dovetailed connection with the ends of the spokes, as shown in Fig. 2, or serrated, as shown in Fig. 3. In either case the spokes are securely locked in their seats and additionally secured by means of the bolts or tie-rods $s^{22}$.

The rim consists of bent wood which has previously been subjected to a process of steaming, and the said rim may have a flat face for small pulleys where one series of spokes is used, or it may be rounded for large wheels having more than one series of spokes.

Having thus described my invention, what I claim as new therein, and desire to secure by Letters Patent, is—

1. A pulley comprising a wooden rim, a hub, a circular spoke-seat and wooden spoke members bent into the form of sectors, the ends of the radial limbs of said members fitted to their seat so that adjacent limbs will form a spoke, said adjacent limbs secured together near the rim and the latter secured to the arcuate portions of the spoke members, and means for securing the spokes to their seat, for the purpose set forth.

2. A pulley comprising a wooden rim, a plurality of series of wooden spokes, each spoke composed of two members bent into the form of a sector whose radial limbs have flat contacting faces, the limbs of a pair of members secured together near the rim and the latter secured to the arcuate portion of said members, in combination with a pair of disks for each series of spokes constructed to interlock, spacing-sleeves between the series of spokes and tie-rods tying the series of spokes together and to the disks, substantially as and for the purpose set forth.

In testimony that I claim the foregoing as my invention I have signed my name in presence of two subscribing witnesses.

ROBERT MACHOLD.

Witnesses:
JOSEF RÜBARD,
ALVESTO S. HOGUE.